United States Patent
Vasireddy

(10) Patent No.: US 11,853,313 B2
(45) Date of Patent: Dec. 26, 2023

(54) SYSTEM AND METHOD FOR LOAD PLAN INTELLIGENT RUN IN A MULTIDIMENSIONAL DATABASE

(71) Applicant: ORACLE INTERNATIONAL CORPORATION, Redwood Shores, CA (US)

(72) Inventor: Gunaranjan Vasireddy, Hyderabad (IN)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 189 days.

(21) Appl. No.: 15/182,320

(22) Filed: Jun. 14, 2016

(65) Prior Publication Data

US 2017/0161344 A1 Jun. 8, 2017

Related U.S. Application Data

(60) Provisional application No. 62/262,761, filed on Dec. 3, 2015.

(51) Int. Cl.
G06F 16/25 (2019.01)
G06F 16/28 (2019.01)

(52) U.S. Cl.
CPC .......... *G06F 16/254* (2019.01); *G06F 16/283* (2019.01)

(58) Field of Classification Search
None
See application file for complete search history.

(56) References Cited

U.S. PATENT DOCUMENTS

| | | | |
|---|---|---|---|
| 9,158,827 B1* | 10/2015 | Vu | G06F 16/254 |
| 9,910,903 B1* | 3/2018 | Jilani | G06F 16/254 |
| 9,953,279 B1* | 4/2018 | Hankins | G06Q 10/06 |
| 2005/0187991 A1* | 8/2005 | Wilms | G06F 11/1402 |
| 2012/0054147 A1* | 3/2012 | Goetz | G06F 17/30563 |
| | | | 707/602 |
| 2012/0173823 A1* | 7/2012 | Nelke | G06F 17/30592 |
| | | | 711/141 |
| 2014/0229423 A1* | 8/2014 | Bengali | G06F 16/2365 |
| | | | 707/602 |
| 2015/0370871 A1* | 12/2015 | Bender | G06F 16/254 |
| | | | 707/602 |
| 2016/0132576 A1* | 5/2016 | Qi | G06F 17/30575 |
| | | | 707/600 |

* cited by examiner

*Primary Examiner* — Thu N Nguyen
(74) *Attorney, Agent, or Firm* — TUCKER ELLIS LLP

(57) ABSTRACT

In accordance with an embodiment, an intelligent load plan that can automatically ensure that a system is in a runnable state and no other conflicting activity can affect the results of the data loads, such as ETLs. Such an intelligent load plan can be used in on data warehousing solutions as well as on a cloud data warehouse solution. The intelligent load plan can, in some embodiments, automatically detect situations based on which it knows it is not supposed to run the load plan.

17 Claims, 10 Drawing Sheets

|  |  | Sales | | Margin | |
|---|---|---|---|---|---|
|  |  | TV | DVD | TV | DVD |
| East | Actual | | | | |
|  | Budget | | | | |
|  | Forecast | | | | |
|  | Variance | | | | |
| West | Actual | | | | |
|  | Budget | | | | |
|  | Forecast | | | | |
|  | Variance | | | | |

Jan, Feb, Mar, Q1, Apr

FIGURE 5

SYSTEM AND METHOD FOR LOAD PLAN INTELLIGENT RUN IN A MULTIDIMENSIONAL DATABASE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims the benefit of priority to U.S. Provisional Application titled "SYSTEM AND METHOD FOR LOAD PLAN INTELLIGENT RUN IN A MULTIDIMENSIONAL DATABASE", Application No. 62/262,761, filed Dec. 3, 2015.

FIELD OF INVENTION

Embodiments of the invention are generally related to online analytical processing and multidimensional database computing environments, and to systems and methods for use of efficient dependency analysis on an underlying lattice.

BACKGROUND

Multidimensional database computing environments enable companies to deliver critical business information to the right people when they need it, including the ability to leverage and integrate data from multiple existing data sources, and distribute filtered information to end-user communities in a format that best meets those users' needs. Users can interact with and explore data in real time, and along familiar business dimensions, enabling speed-of-thought analytics. These are some examples of the types of environment in which embodiments of the invention can be used.

SUMMARY

In accordance with an embodiment, described herein is a system and method for use with a multidimensional database computing environment, for use. In accordance with an embodiment, an intelligent load plan that can automatically ensure that a system is in a runnable state and no other conflicting activity can affect the results of the data loads. Such an intelligent load plan can be used in on data warehousing solutions as well as on a cloud data warehouse solution. The intelligent load plan can, in some embodiments, automatically detect situations based on which it knows it is not supposed to run the load plan.

BRIEF DESCRIPTION OF THE FIGURES

FIG. 2 shows a possible view of a five dimensional database, in accordance with an embodiment.

FIG. 3 shows a possible view of a five dimensional database, in accordance with an embodiment.

FIG. 4 shows a possible view of a five dimensional database, in accordance with an embodiment.

FIG. 5 shows a possible view of a five dimensional database, in accordance with an embodiment.

DETAILED DESCRIPTION

As described above, multidimensional database computing environments enable companies to deliver critical business information to customers on demand, including the ability to leverage and integrate data from multiple existing data sources, and distribute filtered information to end-user communities in a format that best meets those users' needs.

The embodiments of the invention are illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

Multidimensional Databases

Data, such as business data (e.g., financial data) is often viewed in the form of a spreadsheet containing rows and columns of figures. Such spreadsheets can be automated such that changes to one item in a spreadsheet can automatically be reflected in other items on the spreadsheet which use the altered item as a basis for a calculation.

Figure 1:
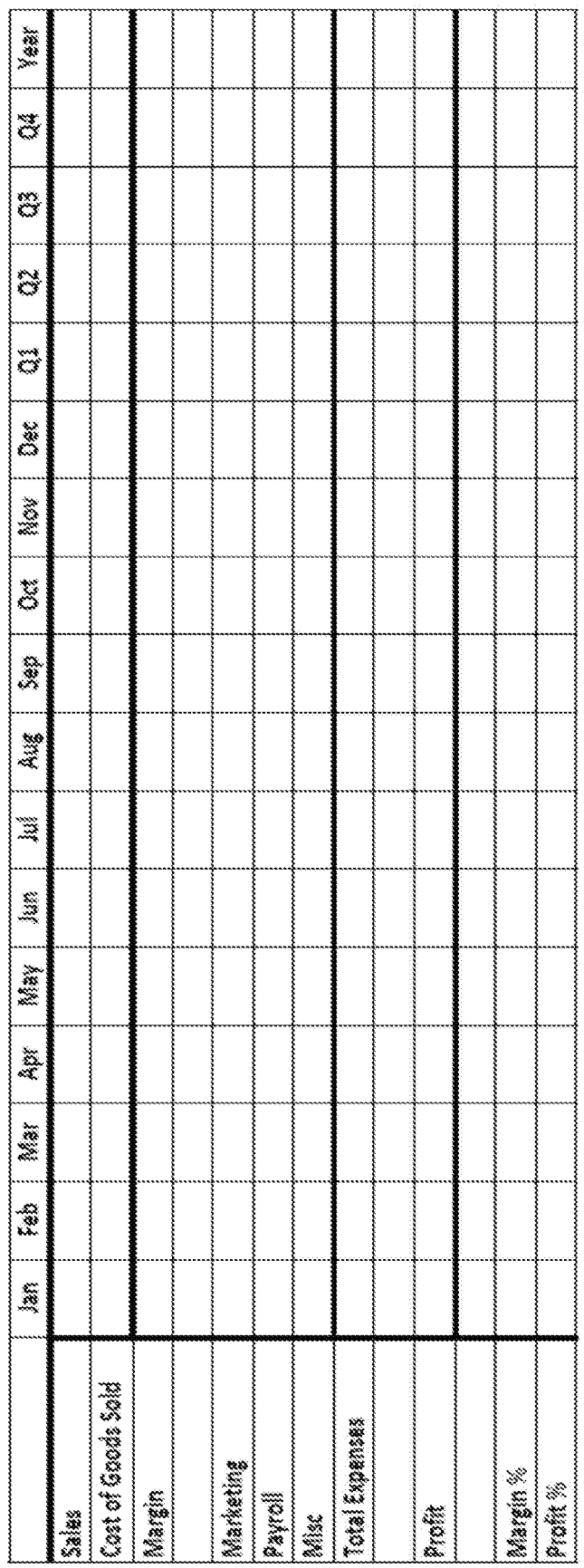
FIG. 1 shows an exemplary data structure, in accordance with an embodiment.

FIG. 1 shows an exemplary data structure, in accordance with an embodiment. A spreadsheet may be thought of as a "two dimensional" array of data. For example, Company X might list income and expense accounts along the vertical axis and the months of the year along the horizontal axis, as shown the figure. Each block in the spreadsheet corresponds to a particular account and a particular month, and the amount of that account in that month, if any, can be entered in that block. In the example of FIG. 1, the list of accounts is one "dimension" and time is the other dimension. Some accounts can depend on other accounts; for example, "Margin" can be "Sales" less "Cost of Goods Sold."

In FIG. 1, the number of potential "cells" or items of data is equal to the number of accounts times the number of time periods included on the spreadsheet. Each item of data can be considered to have two "attributes" or identifying characteristics, one indicating the account to which the indicated amounts are attributed and the second indicating the time period in which the indicated receipts or expenditures took place.

Another factor which becomes important in these applications is the ability to "consolidate" data. For example, the summaries by quarter and year are merely consolidated data from the three months of each quarter or the entire year, respectively. As with the Margin example above, the data for the quarters or the year need not be independently entered, but may be calculated from the monthly data and the spreadsheet instructed to recalculate these figures after any changes to the basic monthly data.

However, clients can have data which has more than two dimensions. For example, Company X may have several product lines, and may wish to be able to view data showing the accounts by each product line over time, rather than, or as well as, by total accounts for the company (i.e., the total of all product lines). Thus, the product lines of Company X make up a third dimension. In turn, the value of each total account for a given time period represents the sum of that account for each of the product lines and thus is the result of consolidating the data from the different product lines.

In such a case, a potential number of data cells is greater, and equal to the number of accounts times the number of months times the number of product lines. Each item of data can now have three attributes, one indicating the account, another indicating the month, and the third indicating the product line represented by the data.

Also, once the number of dimensions exceeds two, it can be useful to be able to view the relationship between any two dimensions. For example, a view of the accounts over time for any or all product lines, accounts by product line for any or all time periods, or product lines over time for any or all accounts. This data can be exhibited by a series of spreadsheets, each showing one such relationship. Thus, the spreadsheet shown in FIG. 1 shows accounts over time; however, it only shows the total accounts. While each account could be broken down by product line, this can increase the size of the spreadsheet and make it more difficult to find all of the entries related to.

In a situation where Company X has another dimension it wishes to track, such as geographic areas, this can constitute a further, fourth dimension. Each item of data now has four attributes, and the total number of potential cells is the three dimensional total times the number of geographic areas. And if the company wishes to have different "scenarios," for example, to make budget forecasts and then compare the actual results to those forecasts, this is a fifth dimension, and five attributes are needed, with the number of potential cells is now multiplied again, this time by the number of possible scenarios.

Figure 2:
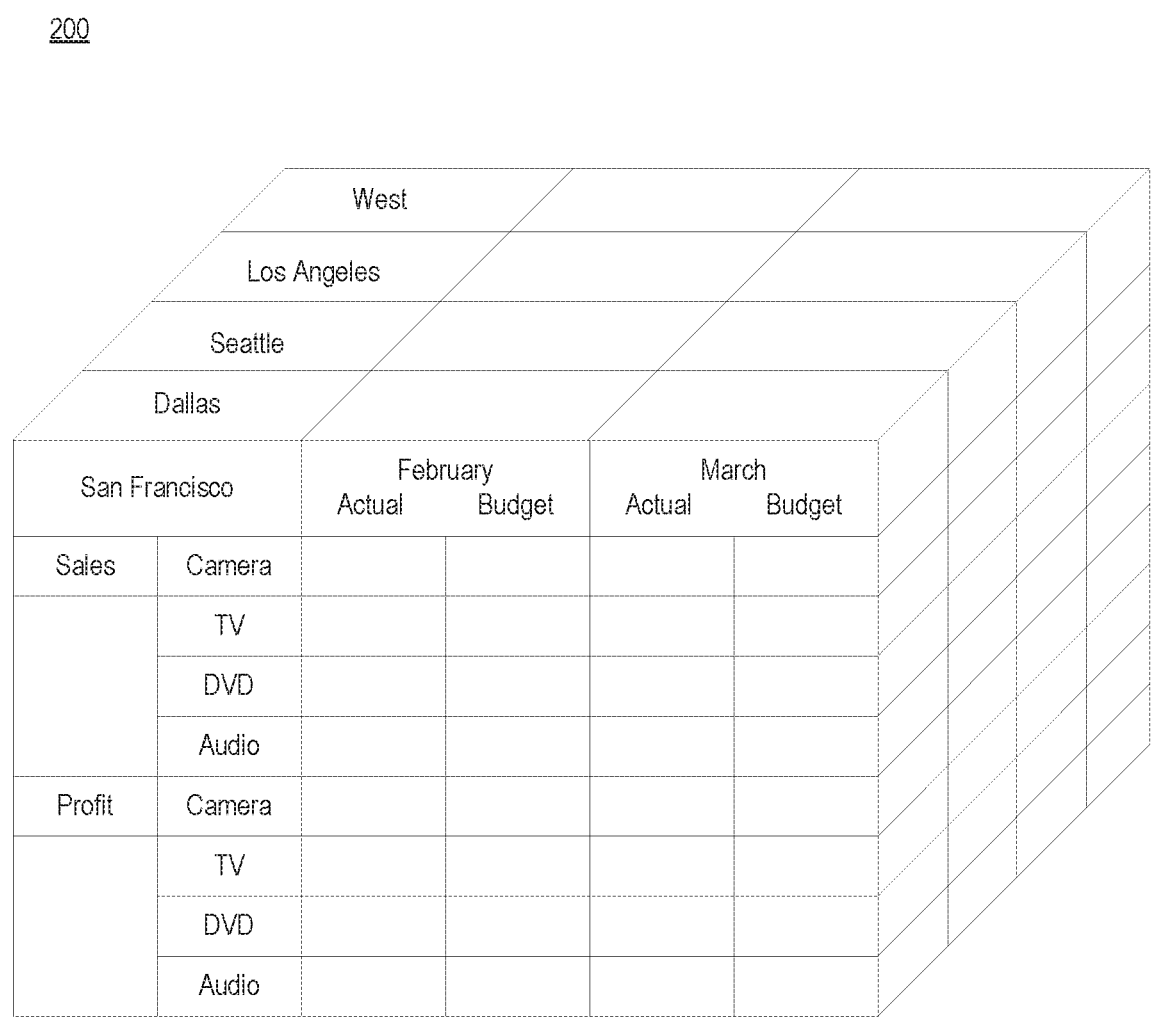
Figure 3:
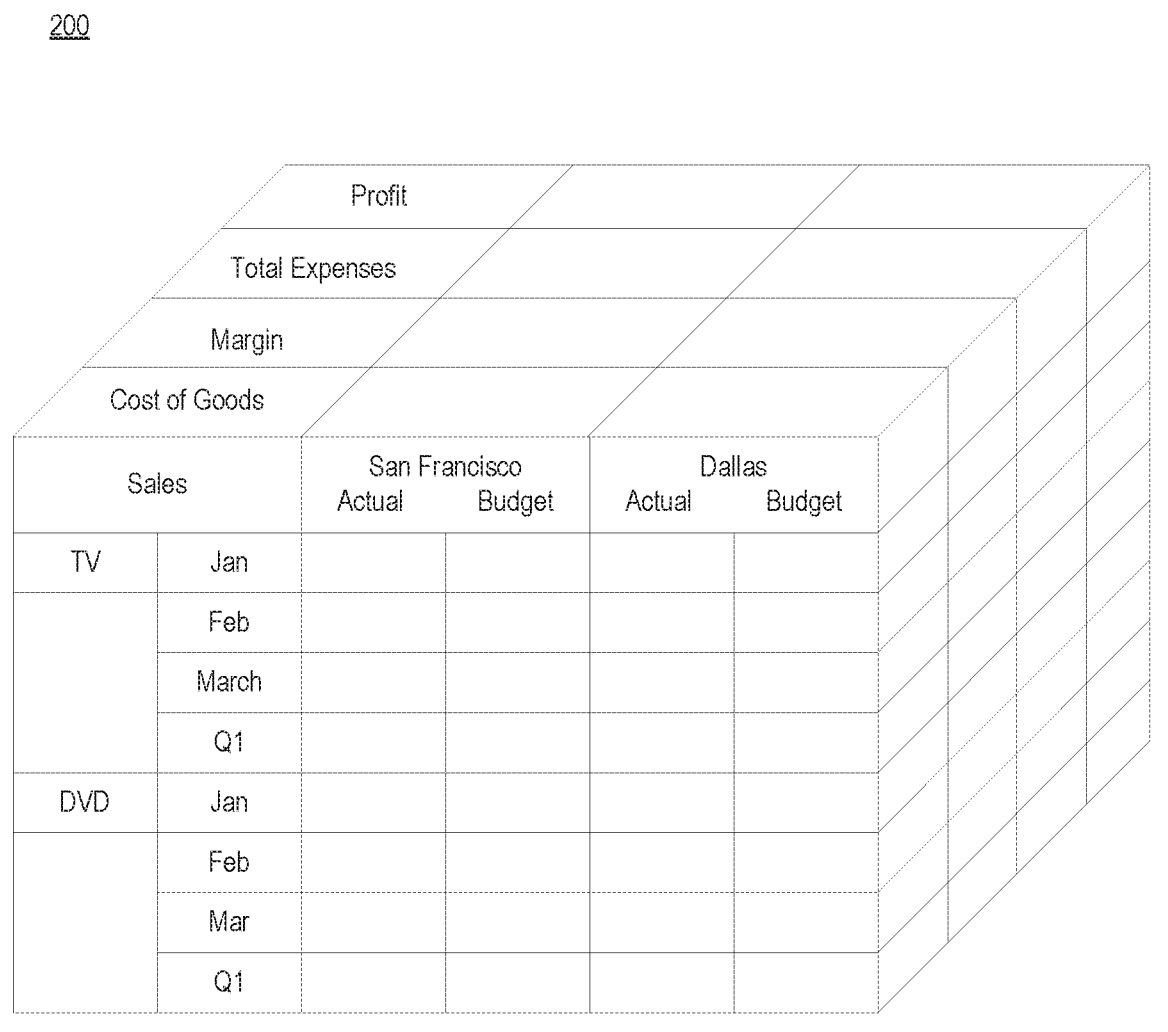
Figure 4:
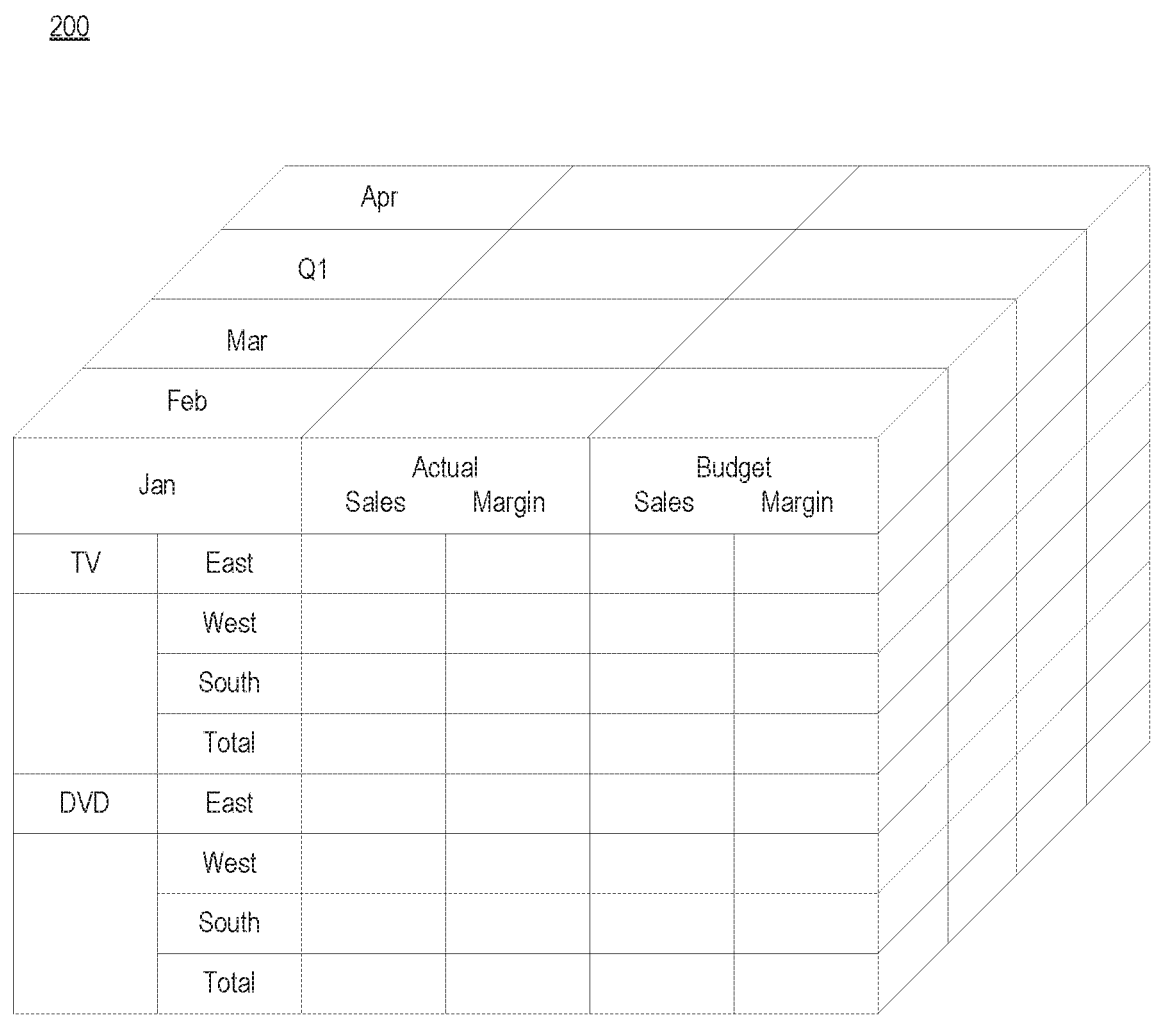

In accordance with an embodiment, in each of these cases, the number of cells required of a spreadsheet to show possible relationships between dimensions also increases dramatically. FIGS. 2-5 show some possible views of a five dimensional database 200, in accordance with various embodiments. For example, the front "face" of the five dimensional database in FIG. 2 is a spreadsheet showing the actual figures for sales and profits for various products as compared to the budgeted figures over time for a market, such as the San Francisco market. Behind the front "face" of the spreadsheet in FIG. 2 are other spreadsheets showing the same information for other cities, followed by a spreadsheet showing the same information for a region, such as "West," i.e., the total for those cities. FIGS. 3, 4, and 5 each show a similar stacks of spreadsheets which represent a three dimensional view of the five dimensional database. In each of these examples, there is some intermingling of more than two dimensions. Many more possible views could be constructed from the five dimensions used here.

Figure 6:
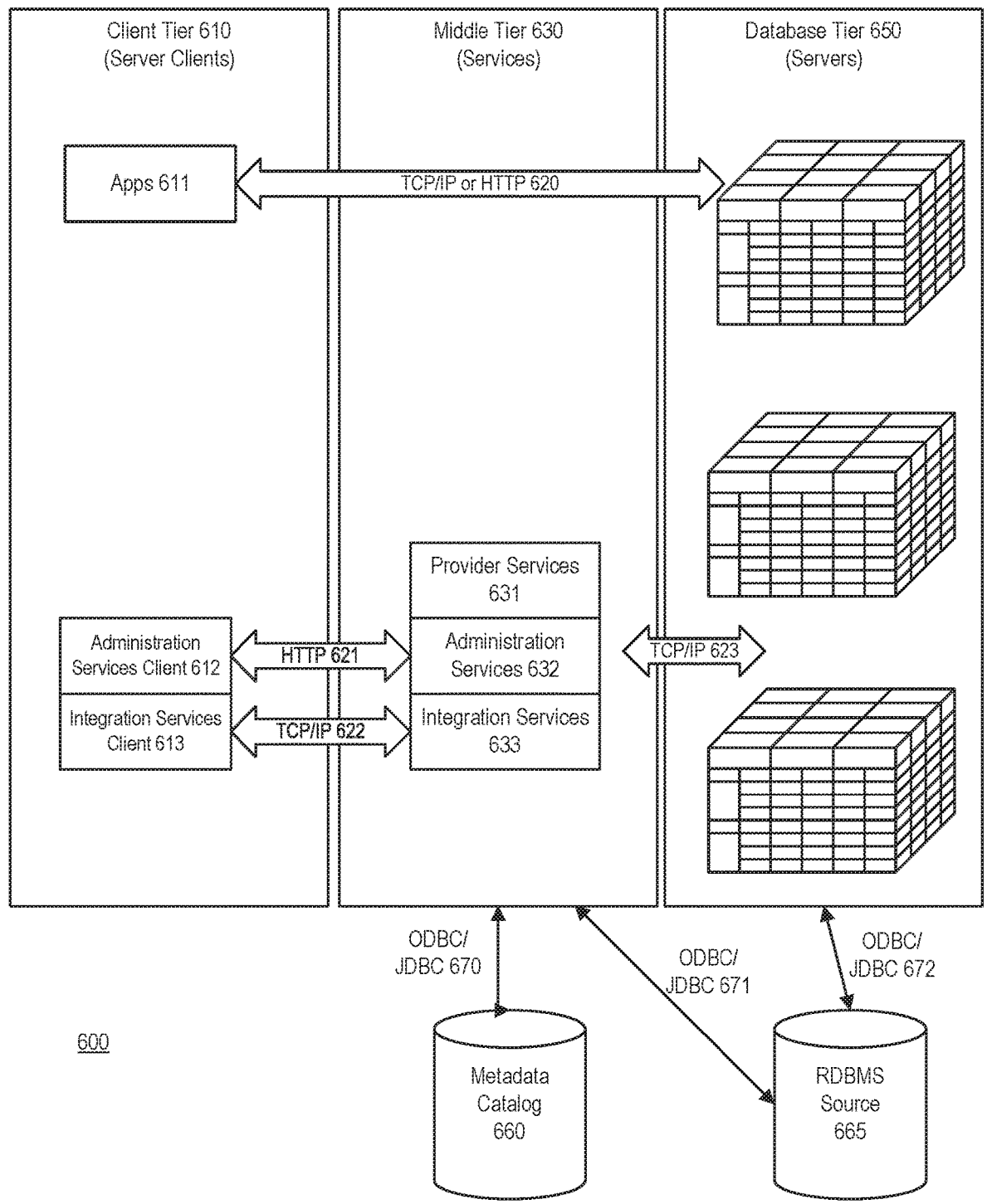
FIG. 6 illustrates a high-level view of the information flow between tiers of a multidimensional database architecture, in accordance with an embodiment.

FIG. 6 illustrates a high-level view of the information flow between tiers of a multidimensional database architecture, in accordance with an embodiment. A client tier 610 can include client applications 611, such as, for example, business intelligence application (e.g., Oracle Hyperion Smart View for Office and Administration Services Console). A client tier can additionally include administration services clients 612 and integration services clients 613. A middle tier 640 can include services, including provider services 631, administration services 632, and integration services 633. A database tier 650 can include servers, such as multidimensional capable servers and star schema servers.

In accordance with an embodiment, communication between the client tier and middle tiers, and the middle and database tiers, can be through a communication, such as through HTTP or TCP/IP 620. Communication between the middle tier and database tier can be through TCP/IP 623. Communication between the client tier and middle tiers can be through TCP/IP 622 or HTTP 621. Communication between data sources, such as a RDBMS (relational database management system) 665 and the metadata catalog 660 with the middle and database tiers can be through ODBC (Oracle Database Connectivity) and JDBC (Java database connectivity) drivers 670, 671, 672. Communication between the In accordance with an embodiment, a system can operate as a multi-threaded online analytical processing (OLAP) database software that takes advantage of symmetric multiprocessing hardware platforms, and is based on deployable, thin-client architecture. The server can act as a shared resource, handling all data storage, caching, calculations, and data security. A client needs only to retrieve and view data that resides on a server.

In accordance with an embodiment, application components, including database outlines and calculation scripts, application control, and multidimensional database information, reside on a server. An administrator or other user can configure server disk storage to span multiple disk drives, enabling storage of large databases. A server can run a multi-threaded operating system so a server can efficiently manage simultaneous requests. A server can also run a server agent process that acts as a traffic coordinator for all user requests to applications.

In accordance with an embodiment, aggregate storage databases provide an alternative to block storage databases and enable dramatic increases in database dimensionality. Using aggregate storage, databases can server a wide range of analytic needs, financial analysis, planning, budgeting, sales analysis, marketing analysis, supply-chain analysis, and profitability analytics, all from a single analytic infrastructure.

In accordance with an embodiment, while several of the embodiments described herein illustrate the use of an Oracle Essbase multidimensional database environment, in accordance with various embodiments the components, features, and methods described herein can be used with other types of online analytical processing or multidimensional database computing environments.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

Extract, Transform, Load

In accordance with an embodiment, clients often desired to load data to a warehouse regularly so that the data can serve its purpose of facilitating business analysis and analytics. To do this, data from one or more operational systems can be extracted and copied into a data warehouse. The challenge in data warehouse environments is to integrate, rearrange and consolidate large volumes of data over many systems, thereby providing a new unified information base for business intelligence.

In accordance with an embodiment, a process of extracting data from source systems and bringing it into the data warehouse is commonly called ETL, which stands for extraction, transformation, and loading. Importantly, in addition to the three steps codified in ETL, a transportation phase can also be present.

In accordance with an embodiment, during an extraction, desired data can identified and extracted from many different sources (e.g., client sources, "on-premise" sources), including database systems and applications. Often, it is not possible to identify the specific subset of interest, therefore more data than necessary can be extracted, so the identification of the relevant data will be done at a later point in time. Depending on the source system's capabilities (for example, operating system resources), some transformations may take place during this extraction process. The size of the extracted data varies from hundreds of kilobytes up to gigabytes, depending on the source system and the business situation. The same can be true for the time delta between two (logically) identical extractions: the time span may vary between days/hours and minutes to near real-time. Web server log files, for example, can easily grow to hundreds of megabytes in a very short period of time.

In accordance with an embodiment, after data has been extracted from the source, it can be transported to the target system or to an intermediate system for further processing. Depending on the chosen way of transportation, some transformations can be done during this process, too.

In accordance with an embodiment, data transformations can range from simple data conversions to extremely complex data scrubbing techniques. Many, if not all, data transformations can occur within a destination database, although transformations can be implemented outside of the database (for example, on flat files) as well. Data transformations can be performed, for example, in a staging table.

In accordance with an embodiment, before or after the data transformation, the data can be loaded into a database, such as an Essbase multidimensional database, or another database having a schema, for example, a star schema.

In accordance with an embodiment, an application, such as OBIA (Oracle Business Intelligence Application) can connect to various sources and perform an ETL from those sources to a data warehouse. The ETL can be a set of mappings that are run in a particular sequence. The term "load plan" can be used to refer to metadata that stores a sequence of the ETL Mappings. The load plan can also help ensure that the mappings get executed in that particular order.

In accordance with an embodiment, ETL load plans can be scheduled to run daily at a designated time (e.g., at night/off peak hours). However there are times when the load plan is not meant to be run and without adequate checks/intelligence, the load plan can corrupt warehoused data. An intelligent load plan can ensure that the system is in a runnable state and no other conflicting activity can affect the results of the data loads. Such an intelligent load plan can be used in on premise data warehousing solutions as well as on a cloud data warehouse solution. The intelligent load plan can, in some embodiments, automatically detect situations based on which it knows it is not supposed to run the load plan.

Intelligent Load Plan

Figure 7:
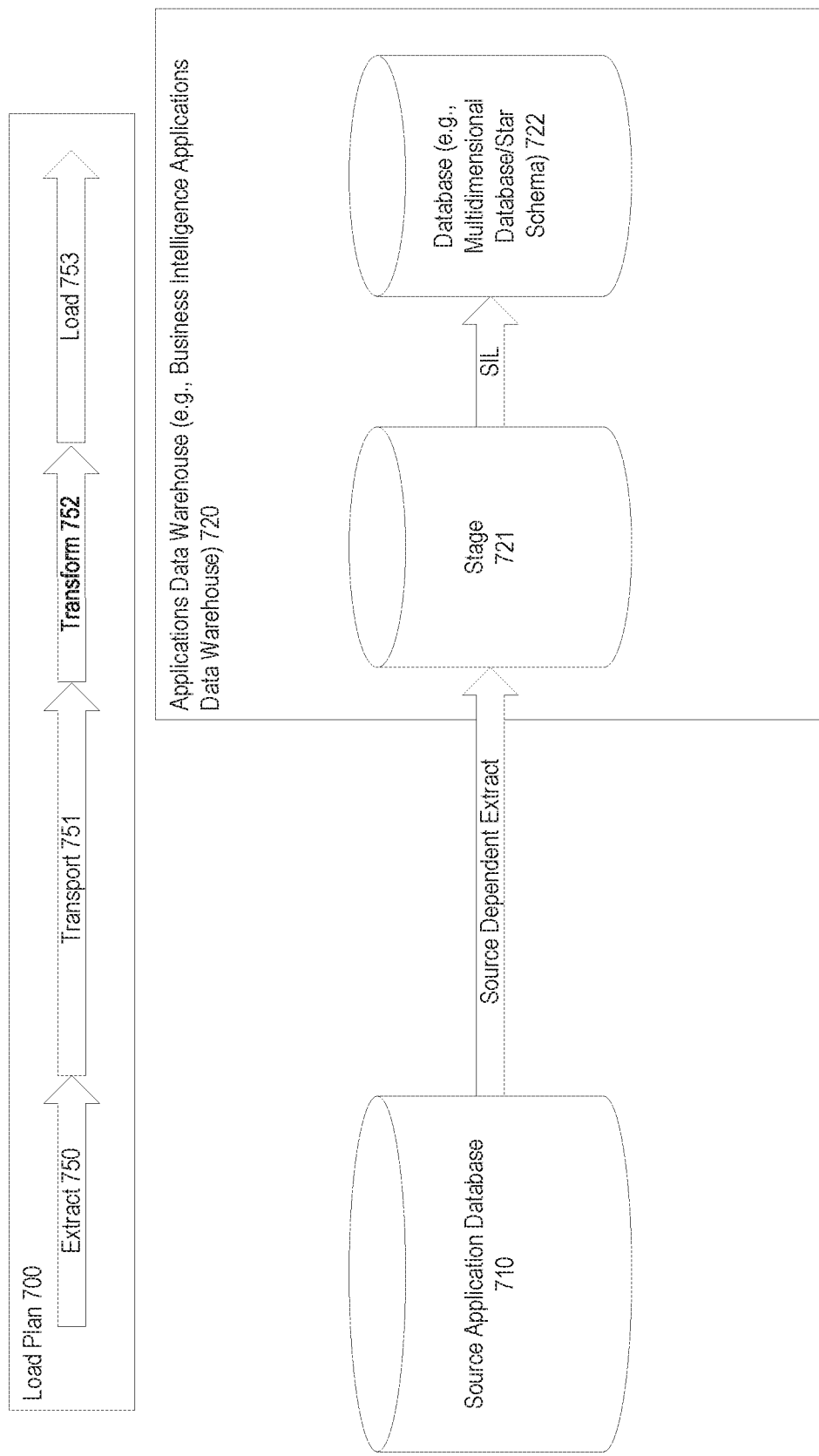
FIG. 7 illustrates an extract, transform, load (ETL) load plan without SDS, in accordance with an embodiment.

FIG. 7 illustrates an extract, transform, load (ETL) load plan without SDS, in accordance with an embodiment.

As shown in FIG. 7, a load plan 700 can comprise a number of steps, including extract 750, transport 751, transform 752, and load 753, in accordance with an embodiment.

In accordance with an embodiment, a source application database 710, such as, for example, a client's on-premise business data, can be the subject of an ETL load plan 700. In such a system, when an ETL load plan is initiated, data can be extracted 750 from the source application database 710, and can be transported 751 to an applications data warehouse 720 (e.g., Business Intelligence Applications Data Warehouse) via a communication method, such as a source dependent extract (SDE). Once at the data warehouse 720, the extracted data can be gathered into a stage 721, such as a staging table, where the data can be transformed 752 such that it can be loaded 753 into a database 722, such as multidimensional database (e.g., Essbase), or a star schema database via a source independent load (SIL) mapping.

Figure 8:
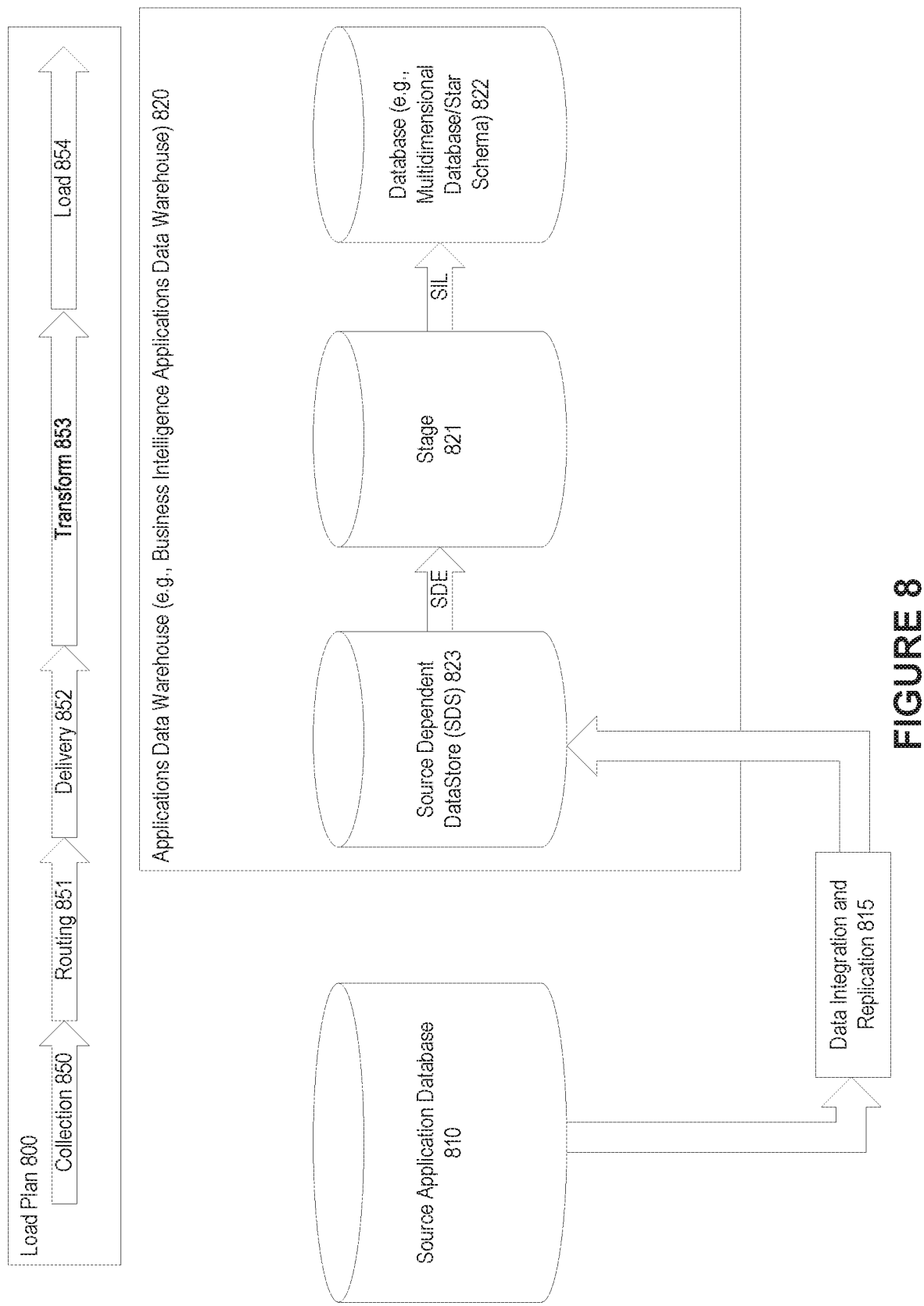
FIG. 8 illustrates an extract, transform, load (ETL) load plan with SDS, in accordance with an embodiment.

FIG. 8 illustrates an extract, transform, load (ETL) load plan with SDS, in accordance with an embodiment.

As shown in FIG. 8, a load plan 800 can comprise a number of steps, including collection 850, routing 851, delivery 852, transform 853, and load 854, in accordance with an embodiment.

In accordance with an embodiment, a source application database 810, such as, for example, a client's on-premise business data, can be the subject of an ETL load plan 800. In such a system, when an ETL load plan is initiated, data can be collected 850 from the source application database 810, and can be routed 851 a data integration and replication 815 module, such as Oracle Golden Gate, where the source data can be replicated and prepared to be delivered 852 to a source dependent datastore (SDS) 823. Once the replicated data has been successfully delivered to the SDS 853 at the data warehouse 820, the data can be extracted (via, for example, SDE) to a stage 821. At the stage (e.g., a staging table), the data can be transformed 853 such that it can be loaded 854 into a database 822, such as multidimensional database (e.g., Essbase), or a star schema database via a source independent load (SIL) mapping.

In accordance with an embodiment, a load plan can allow for loading data into a warehouse, such as a data warehouse. However there are certain situations where a load plan should not run as the running of a load plan could cause data corruption or other issues.

In accordance with an embodiment, a load plan should not be run when the system is being patched/upgraded. Until a patch completes, no load plan should run. There are cases where as part of the patch certain source data can be re-extracted and loaded. At such times, a direct source connection is not possible. A typical case is when the warehouse is on the cloud. One of the approaches for such a case is to have a process on the source that extracts the files and then places them at a place that is accessible to the warehouse load plan. In such cases, the patching process might need to wait for the extract process to place the files at the accessible location before extract process can complete the re-extract and load process. This whole cycle can take over a day. While all this is going on, the load plan should not run as the patching process is not yet complete. However since there are loads that are being done as part of the patching, the system/services should still be up.

In accordance with an embodiment, a load plan should not be run when a source system has upgraded. An ETL is configured to connect to a particular source. The source itself can get upgraded over time. Unless the source is totally backward compatible, running the same ETL mapping against the upgraded source can cause data corruption and/or ETL failures. For example, during a source system upgrade, the source table/column names could have changed. The primary key (which can also be referred to as grain) of the table might have changed. The format of data might have changed (e.g. the column length might have been extended and the data might have been padded with extra zeroes). Because of these changes, it would be unwise to run an ETL before updating the ETL to account for the upgrades to the source system.

In accordance with an embodiment, a load plan should not run when there is a blackout window (e.g., for maintenance purposes during off-peak hours). The system administrators may have certain blackout/maintenance windows they want to setup. Since the system could potentially go down during that window, no load plan should either start or run into this maintenance window.

In accordance with an embodiment, a load plan should not run when another load plan is already running. ETL load plans typically can use certain temporary tables that are truncated with every load. A particular load plan might be nearing completion and has not consumed the data in these temporary tables. If another load plan starts in the meantime and truncates the data in the temporary tables, then the data would be lost.

In accordance with an embodiment, a load plan should not run when a SDS is not yet ready/available. A SDS (Source Dependent Data Store) can be a feature of a warehouse. Instead of directly connecting to the source, a replica of a source can be created in a separate schema (the SDS) on the warehouse. The load plan can then point to the SDS instead of the source. This is useful when a direct connection to the source is not possible (e.g., on the cloud) or when a direct connection to the source is undesirable (e.g., due to performance concerns). A replication technology, such as Oracle Golden Gate, can be used to load the SDS. However if the SDS is not yet completely loaded, then running the load plan on an incomplete SDS can cause data corruption in the warehouse.

In either of the systems described above, or any other similar system, if a load plan is run during any of the events described above, then the data in the warehouse can be corrupted. This can, in turn, lead to downtime before the corruption is detected, if at all. In the worst case scenario, the only way to recover from such a situation could be to do a full warehouse reload which is very expensive and also means that the reporting from the warehouse solution is not available until that fix is done. Especially in a cloud based solution, downtime is something that can be ill afforded. An intelligent load plan can eliminate such downtime by preventing data corruption from happening in the first place.

In accordance with an embodiment, an intelligent load plan can place restrictions on when a load plan can be scheduled. However this makes it complicated for the end user and also doesn't cater to unscheduled restrictions. It will also not work when the customer decides to do an ad-hoc run of the load plan.

In accordance with an embodiment, there is no restriction on scheduling of the load plan itself. In such embodiments, a load plan can be setup on, for example, a recurring schedule at a convenient time. An intelligent load plan, when it is triggered (either ad-hoc or by virtue of the schedule), can then check for various conditions and, if all the checks turn out to be favorable, continue running the load plan. Otherwise, the intelligent load plan can throw a warning and abort the load plan.

In accordance with an embodiment, the below are various conditions that an intelligent load plan can check. If any of the checks return an unfavorable result, the intelligent load plan can throw an exception and abort the load plan/ETL.

In accordance with an embodiment, an intelligent load plan can perform a check to determine if a system is being patched and/or upgraded. A patch orchestrator (e.g., software that is responsible to run/apply a patch) makes an entry in a database table at the start of a patch indicating that a patch is in progress. When an intelligent load plan starts, it can perform a check on this table to determine if there is a patch/upgrade in progress. If the intelligent load plan determines that there is a patch/upgrade in progress, a warning can be thrown and the load plan can be aborted. On completion of the patch, the patch orchestrator then removes the indicator from the database table. Whenever a subsequent load plan runs (either by virtue of the schedule or ad-hoc run), it can then find no in-progress patch and proceed with the remainder of the checks or perform the data load.

In accordance with an embodiment, an intelligent load plan can perform a check to determine whether a source system has been upgraded. When a source is registered, there is metadata stored that records the version of that source. When an intelligent load plan runs, it can check the version of the source against the version the load plan is expecting. If there is a mismatch, the load plan can make an entry in the database table indicating that a source upgrade process needs to be run. Any subsequent load plan will then not proceed to do the data load until the source upgrade process is run. This same event can also be eventually used to automatically trigger the source upgrade. At times, it is possible that the source is backward compatible. This means that although the source has upgraded, the previous version code will still work fine. In such a case, instead of checking against an individual source version, the version check can be performed against a range of supported versions. If it is determined that a load plan is incompatible with an upgraded source, then the intelligent load plan can throw a warning and can abort the load plan.

In accordance with an embodiment, an intelligent load plan can perform a check to determine if there is a blackout/maintenance window. A system administrator can be provided with a utility that can allow the administrator to specify a blackout window (e.g., for maintenance). This information can be persisted in a database table. When an intelligent load plan is run, the intelligent load plan can check to see if there is any blackout window that will interfere with the load plan. For example, this can check to determine if a blackout window is currently in progress, or if a blackout window will trigger during the load plan. The check can also determine if a load plan can complete before a schedule blackout window by checking a remaining amount of time before a blackout window is scheduled against past load plan run durations to determine if the load plan's execution is likely to run into the blackout window. If the load plan is likely going to run into the blackout window, the intelligent load plan does not proceed to do data load and instead throws a warning/exception and can abort the load plan.

In accordance with an embodiment, an intelligent load plan can perform a check to determine if there is another load plan is already running. At the start of an intelligent load plan, the intelligent load plan can check if there is another load plan that is already running. If the check determines that another load plan is running, the intelligent load plan does not proceed to do the data load. Instead, the load plan can throw a warning and abort.

In accordance with an embodiment, an intelligent load plan can perform a check to determine whether a SDS is not yet ready. If an SDS is incomplete or still being replicated by the replication process, then performing a data load by querying that SDS can cause data integrity issues/data corruption. The utility that is loading the SDS can make an entry into a database table whenever it starts loading a particular SDS table. Once the SDS table is loaded, the entry is updated to indicate that the loading is complete and that a SDS table has been refreshed successfully. When the intelligent load plan is run, it can perform a check on a database to determine whether there is any SDS table that is still being loaded. If there is even one entry, the intelligent load plan can determine that the SDS is not ready. However, instead of aborting the entire load plan, the intelligent load plan skips the load for only that particular source. Because and SDS can have data from multiple sources, if there are other sources for which the data is ready, the intelligent load proceeds to load the data from those sources that have completed instead.

Figure 9:
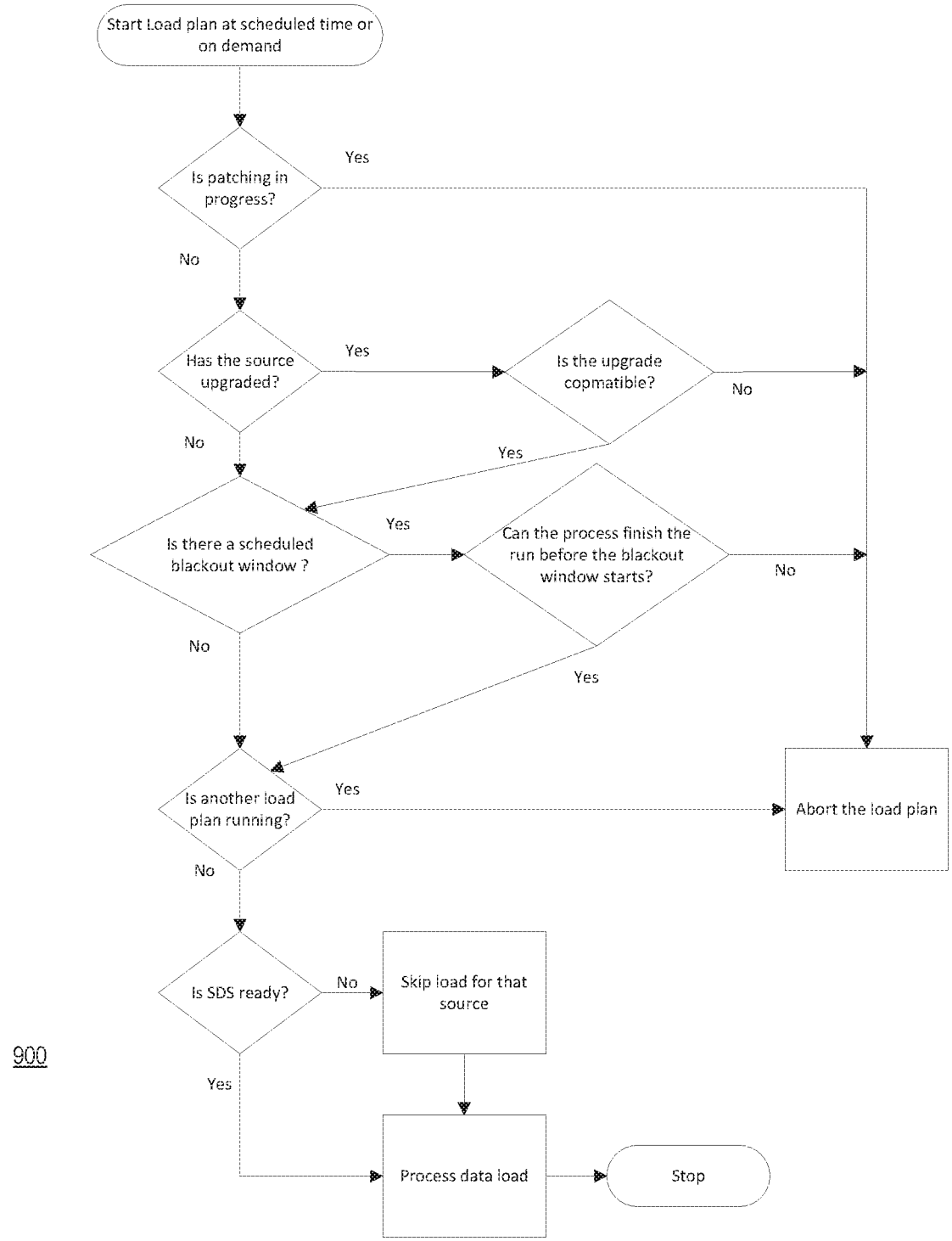
FIG. 9 illustrates a decision tree for an intelligent load plan, in accordance with an embodiment.

FIG. 9 illustrates a decision tree for an intelligent load plan, in accordance with an embodiment.

In accordance with an embodiment, an intelligent load plan can follow some or all of the decision tree 900 depicted in FIG. 9.

In accordance with an embodiment, an intelligent load plan can start on an ad hoc (e.g., "on demand" basis), or on at a scheduled time (e.g., during off-peak hours). The intelligent load plan can perform a check to determine if a patching (either of the source data or the data warehouse) is currently in progress. If a patching is in progress, the intelligent load plan can throw an exception and abort the load plan.

In accordance with an embodiment, an intelligent load plan can determine if a source (e.g., data source) has been upgraded. If the source has been upgraded, the intelligent load plan can check to determine whether the upgrade is compatible. If the upgrade is not compatible, the intelligent load plan can throw an exception and abort the load plan.

In accordance with an embodiment, an intelligent load plan can determine if there is a scheduled blackout window. If there is a scheduled blackout window, the intelligent load plan can determine if the load plan can complete before the scheduled blackout window starts. If not, then the intelligent load plan can throw an exception and abort the load plan.

In accordance with an embodiment, an intelligent load plan can determine if there is another load currently running. If there is another load plan running, the intelligent load plan can throw an exception and abort the load plan.

In accordance with an embodiment, an intelligent load plan can determine if an SDS is ready. An intelligent load plan can perform a check to determine whether there is any SDS table that is still being loaded. If there is even one entry, the intelligent load plan can determine that the SDS is not ready for that source, and can skip the load for that source until it is complete. However, if there are other sources in the SDS that are completely replicated, then the load plan can run for those sources.

Figure 10:
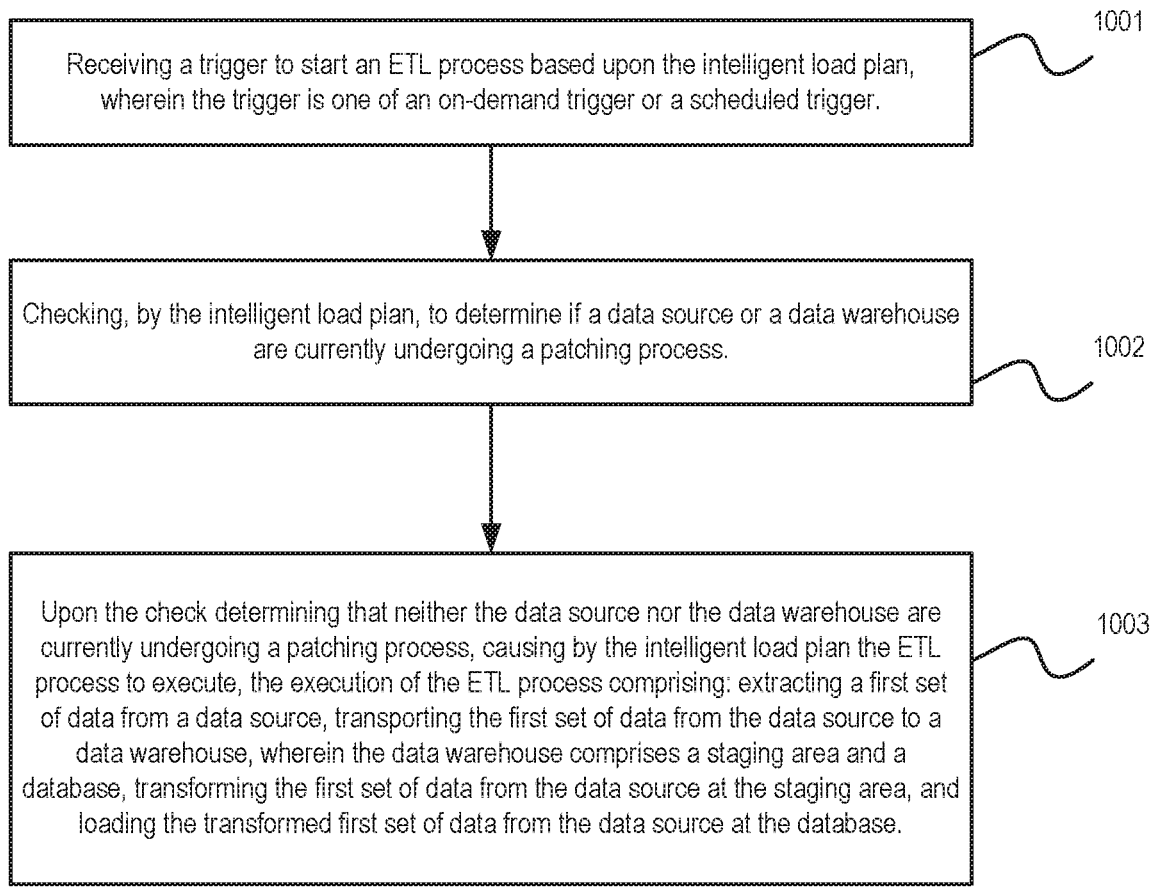
FIG. 10 illustrates a flow chart for a method for load plan intelligent run, in accordance with an embodiment.

FIG. 10 illustrates a flow chart for a method for load plan intelligent run in a multidimensional database, in accordance with an embodiment.

At step 1001, a method can receive a trigger to start an ETL process based upon the intelligent load plan, wherein the trigger is one of an on-demand trigger or a scheduled trigger.

At step 1002, the method can check, by the intelligent load plan, to determine if a data source or a data warehouse are currently undergoing a patching process.

At step 1003, upon the check determining that neither the data source nor the data warehouse are currently undergoing a patching process, the method can cause the intelligent load plan to execute the ETL process, the execution of the ETL process comprising: extracting a first set of data from a data source, transporting the first set of data from the data source to a data warehouse, wherein the data warehouse comprises a staging area and a database, transforming the first set of data from the data source at the staging area, and loading the transformed first set of data from the data source at the database.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. Embodiments of the present invention may use some or all of the features shown in the various disclosed embodiments where such features are not structurally or functionally incompatible. It is intended that the scope of the invention be defined by the claims and their equivalents.

What is claimed is:

1. A method for intelligent load plan run in a multidimensional database, the method comprising:

receiving a trigger to start an extract, transform, load (ETL) process based upon the intelligent load plan, wherein the trigger is one of an on-demand trigger or a scheduled trigger;

checking, by the intelligent load plan, a database table for an indicator to determine if a data source or a data warehouse are currently undergoing an upgrading process to a new version, wherein the data source comprises a source dependent datastore (SDS);

replicating a first set of data, from a source application database, into the SDS;

checking, by the intelligent load plan, to determine whether the replication of the first set of data into the SDS is complete; and upon the check, by the intelligent load plan, of the database table determining that neither the data source nor the data warehouse are currently undergoing an upgrading process to a new version, and upon the check, by the intelligent load plan, determining that the replication of the first set of data into the SDS is complete, causing, by the intelligent load plan, the ETL process to execute, the execution of the ETL process comprising:
  extracting the first set of data from the data source,
  transporting the first set of data from the data source to the data warehouse, wherein the data warehouse comprises a staging area and a database,
  transforming the first set of data from the data source at the staging area, and loading the transformed first set of data from the data source at the database; and
upon the check determining that at least one of the data source and the data warehouse is undergoing an upgrading process to a new version, issuing a warning by the intelligent load plan, and causing, by the intelligent load plan, the ETL process to be aborted prior to the execution of the ETL process,
  said check determining that at least one of the data source and the data warehouse is undergoing an upgrading process to a new version being based upon an entry within the database table indicative of an active upgrading process,
  said entry being made by a patch orchestrator, the patch orchestrator being responsible for upgrading the at least one of the data source and the data warehouse, and wherein upon completion of the upgrading process, the patch orchestrator removes the indicator from the database.

2. The method of claim 1, further comprising:
checking, by the intelligent load plan, prior to the intelligent load plan causing the ETL process to execute, to determine if the data source has been upgraded; and
upon the check determining that the data source has not been upgraded, allowing the intelligent load plan to cause the ETL process to execute.

3. The method of claim 2, further comprising:
upon the check determining that the data source has been upgraded, checking, by the intelligent load plan, to determine if the upgraded data source is compatible; and
upon the check determining that the upgraded data source is compatible, allowing the intelligent load plan to cause the ETL process to execute.

4. The method of claim 1, further comprising:
checking, by the intelligent load plan, prior to the intelligent load plan causing the ETL process to execute, to determine if there is a scheduled blackout window; and
upon the check determining that there is not a scheduled blackout window, allowing the intelligent load plan to cause the ETL process to execute.

5. The method of claim 4, further comprising:
upon the check determining that there is a blackout window, checking, by the intelligent load plan, to determine if the ETL process can complete before the blackout window begins; and
upon the check determining that the ETL process can complete before the blackout window begins, allowing the intelligent load plan to cause the ETL process to execute.

6. The method of claim 1, further comprising:
checking, by the intelligent load plan, prior to the intelligent load plan causing the ETL process to execute, to determine if another load plan is currently running; and
upon the check determining that another load plan is not currently running, allowing the intelligent load plan to cause the ETL process to execute.

7. A system for intelligent load plan run in a multidimensional database, the system comprising:
one or more microprocessors; and
a processor, running on the one or more microprocessors, wherein the processor operates to perform steps comprising:
  receiving a trigger to start an extract, transform, load (ETL) process based upon the intelligent load plan, wherein the trigger is one of an on-demand trigger or a scheduled trigger;
  checking, by the intelligent load plan, a database table for an indicator to determine if a data source or a data warehouse are currently undergoing an upgrading process to a new version, wherein the data source comprises a source dependent datastore (SDS);
  replicating a first set of data, from a source application database, into the SDS;
  checking, by the intelligent load plan, to determine whether the replication of the first set of data into the SDS is complete; and
  upon the check, by the intelligent load plan, of the database table determining that neither the data source nor the data warehouse are currently undergoing an upgrading process to a new version, and upon the check, by the intelligent load plan, determining that the replication of the first set of data into the SDS is complete, causing, by the intelligent load plan, the ETL process to execute, the execution of the ETL process comprising:
    extracting the first set of data from the data source,
    transporting the first set of data from the data source to the data warehouse, wherein the data warehouse comprises a staging area and a database,
    transforming the first set of data from the data source at the staging area, and
    loading the transformed first set of data from the data source at the database; and
  upon the check determining that at least one of the data source and the data warehouse is undergoing an upgrading process to a new version, issuing a warning by the intelligent load plan, and causing, by the intelligent load plan, the ETL process to be aborted prior to the execution of the ETL process,
    said check determining that at least one of the data source and the data warehouse is undergoing an upgrading process to a new version being based upon an entry within the database table indicative of an active upgrading process,
    said entry being made by a patch orchestrator, the patch orchestrator being responsible for upgrading the at least one of the data source and the data warehouse, and wherein upon completion of the upgrading process, the patch orchestrator removes the indicator from the database.

8. The system of claim 7, wherein the processor operates to perform further steps comprising:
checking, by the intelligent load plan, prior to the intelligent load plan causing the ETL process to execute, to determine if the data source has been upgraded; and
upon the check determining that the data source has not been upgraded, allowing the intelligent load plan to cause the ETL process to execute.

9. The system of claim 8, wherein the processor operates to perform further steps comprising:
upon the check determining that the data source has been upgraded, checking, by the intelligent load plan, to determine if the upgraded data source is compatible; and upon the check determining that the upgraded data source is compatible, allowing the intelligent load plan to cause the ETL process to execute.

10. The system of claim 7, wherein the processor operates to perform further steps comprising:
checking, by the intelligent load plan, prior to the intelligent load plan causing the ETL process to execute, to determine if there is a scheduled blackout window; and
upon the check determining that there is not a scheduled blackout window, allowing the intelligent load plan to cause the ETL process to execute.

11. The system of claim 10, wherein the processor operates to perform further steps comprising:
upon the check determining that there is a blackout window, checking, by the intelligent load plan, to determine if the ETL process can complete before the blackout window begins; and
upon the check determining that the ETL process can complete before the blackout window begins, allowing the intelligent load plan to cause the ETL process to execute.

12. The system of claim 7, wherein the processor operates to perform further steps comprising:
checking, by the intelligent load plan, prior to the intelligent load plan causing the ETL process to execute, to determine if another load plan is currently running; and
upon the check determining that another load plan is not currently running, allowing the intelligent load plan to cause the ETL process to execute.

13. A non-transitory machine readable storage medium having instructions stored thereon for intelligent load plan run in a multidimensional database, that when executed cause a system to perform the steps comprising:
receiving a trigger to start an extract, transform, load (ETL) process based upon the intelligent load plan, wherein the trigger is one of an on-demand trigger or a scheduled trigger;
checking, by the intelligent load plan, a database table for an indicator to determine if a data source or a data warehouse are currently undergoing an upgrading process to a new version, wherein the data source comprises a source dependent datastore (SDS);
replicating a first set of data, from a source application database, into the SDS;
checking, by the intelligent load plan, to determine whether the replication of the first set of data into the SDS is complete; and
upon the check, by the intelligent load plan, of the database table determining that neither the data source nor the data warehouse are currently undergoing an upgrading process to a new version, and upon the check, by the intelligent load plan, determining that the replication of the first set of data into the SDS is complete, causing, by the intelligent load plan, the ETL process to execute, the execution of the ETL process comprising:
extracting the first set of data from the data source,
transporting the first set of data from the data source to the data warehouse, wherein the data warehouse comprises a staging area and a database,
transforming the first set of data from the data source at the staging area, and loading
the transformed first set of data from the data source at the database; and
upon the check determining that at least one of the data source and the data warehouse is undergoing an upgrading process to a new version, issuing a warning by the intelligent load plan, and causing, by the intelligent load plan, the ETL process to be aborted prior to the execution of the ETL process,
said check determining that at least one of the data source and the data warehouse is undergoing an upgrading process to a new version being based upon an entry within the database table indicative of an active upgrading process,
said entry being made by a patch orchestrator, the patch orchestrator being responsible for upgrading the at least one of the data source and the data warehouse, and wherein upon completion of the upgrading process, the patch orchestrator removes the indicator from the database.

14. The non-transitory computer readable storage medium of claim 13, the steps further comprising:
checking, by the intelligent load plan, prior to the intelligent load plan causing the ETL process to execute, to determine if the data source has been upgraded; and
upon the check determining that the data source has not been upgraded, allowing the intelligent load plan to cause the ETL process to execute.

15. The non-transitory computer readable storage medium of claim 14, the steps further comprising:
upon the check determining that the data source has been upgraded, checking, by the intelligent load plan, to determine if the upgraded data source is compatible; and
upon the check determining that the upgraded data source is compatible, allowing the intelligent load plan to cause the ETL process to execute.

16. The non-transitory computer readable storage medium of claim 13, the steps further comprising:
checking, by the intelligent load plan, prior to the intelligent load plan causing the ETL process to execute, to determine if there is a scheduled blackout window; and
upon the check determining that there is not a scheduled blackout window, allowing the intelligent load plan to cause the ETL process to execute.

17. The non-transitory computer readable storage medium of claim 16, the steps further comprising:
upon the check determining that there is a blackout window, checking, by the intelligent load plan, to determine if the ETL process can complete before the blackout window begins; and
upon the check determining that the ETL process can complete before the blackout window begins, allowing the intelligent load plan to cause the ETL process to execute.

* * * * *